United States Patent [19]
Wood

[11] Patent Number: 5,675,687
[45] Date of Patent: Oct. 7, 1997

[54] SEAMLESS MULTI-SECTION VISUAL DISPLAY SYSTEM

[75] Inventor: Anthony B. Wood, Dallas, Tex.

[73] Assignee: Texas Instruments Incorporated, Dallas, Tex.

[21] Appl. No.: 560,189

[22] Filed: Nov. 20, 1995

[51] Int. Cl.⁶ ................................................. G02B 6/04
[52] U.S. Cl. ................................................. 385/115
[58] Field of Search ................................. 385/115, 116, 385/121, 147; 359/42, 120, 901; 345/87, 903

[56] References Cited

U.S. PATENT DOCUMENTS 5,251,280  10/1993  Asada et al. ............................ 385/115
5,502,457  3/1996  Sakai et al. ............................ 345/87

Primary Examiner—Akm E. Ullah
Attorney, Agent, or Firm—Bret J. Petersen; Ronald O. Neerings; Richard L. Donaldson

[57] ABSTRACT

A multi-section visual display system (20) for producing visual images that appear seamless to the user comprising at least two visual displays (26, 28), a light pipe (54, 56), which includes a plurality of parallel fiber optic segments having a polished surface or an integrated polymeric structure that guides light, disposed in parallel to each of the visual displays (26, 28) and an assembly (44) for mounting the visual displays (26, 28) adjacent to one another such that adjacent light pipes (54, 56) bend light toward one another to provide a seamless visual image.

19 Claims, 3 Drawing Sheets

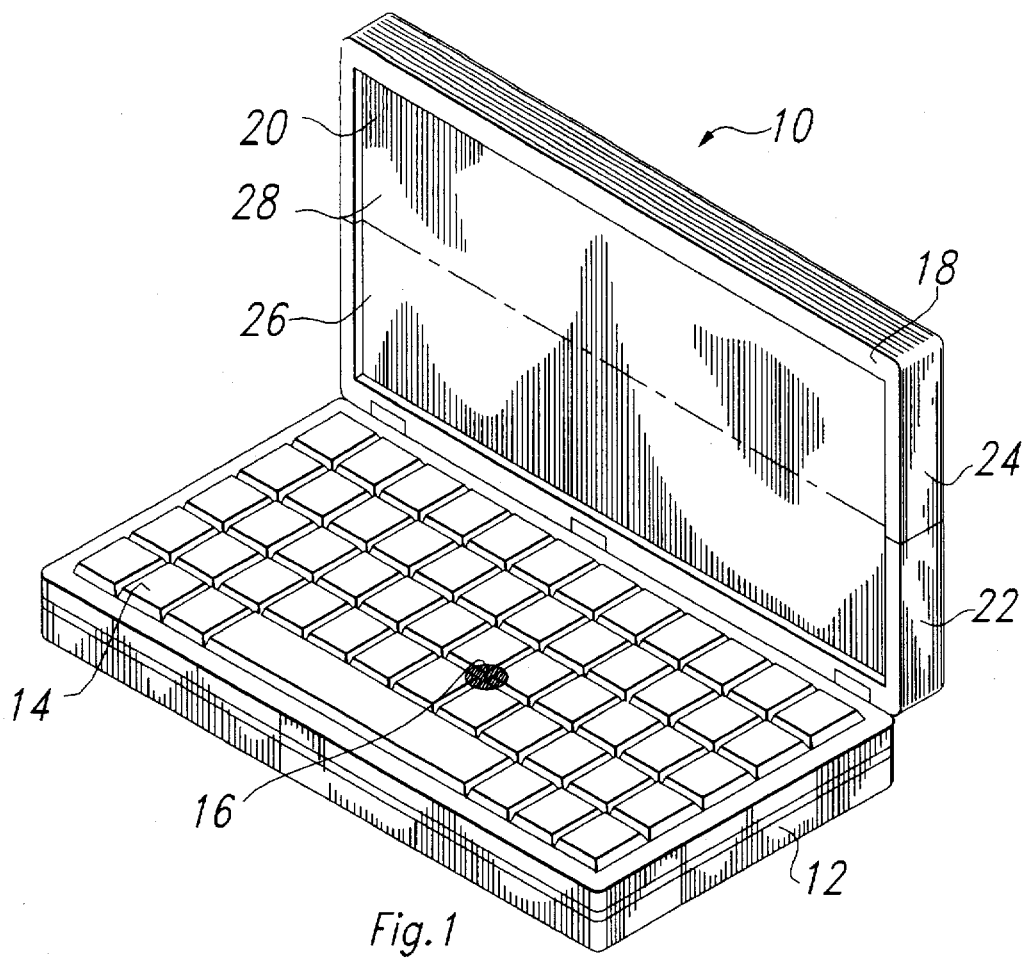
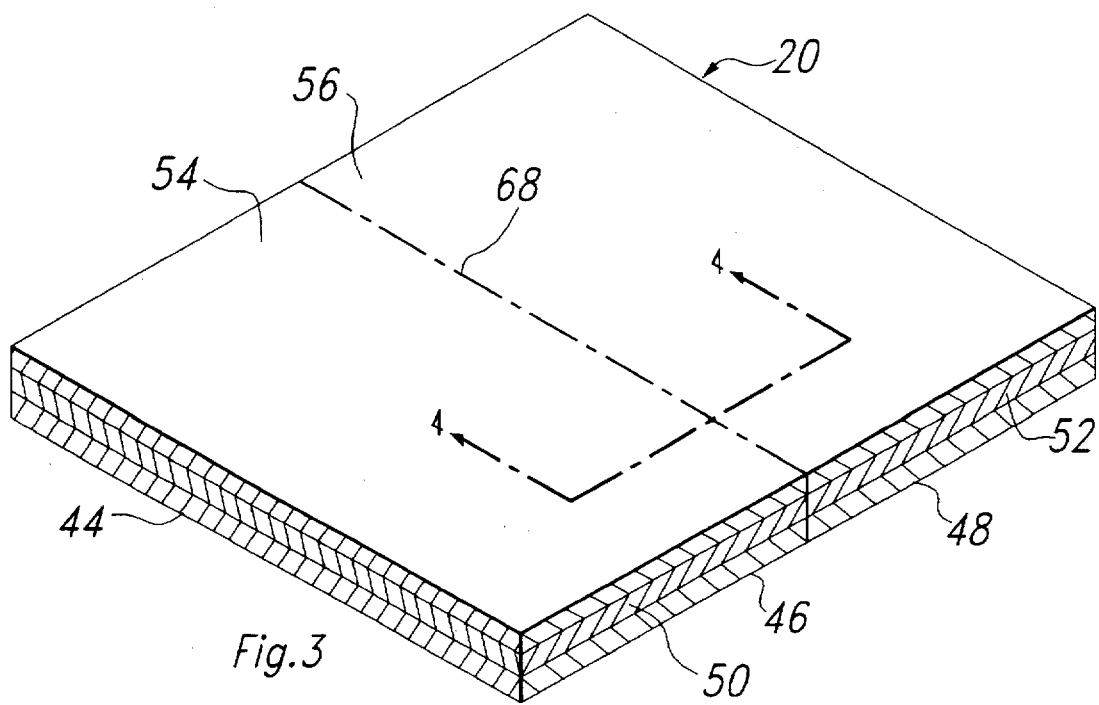

SEAMLESS MULTI-SECTION VISUAL DISPLAY SYSTEM

TECHNICAL FIELD OF THE INVENTION

This invention relates in general to an apparatus for generating visual images, and in particular to, a multi-section visual display system for portable computer display applications which produces a visual image that appears seamless to the user.

BACKGROUND OF THE INVENTION

Without limiting the scope of the invention, its background is described in connection with portable computer monitors, as an example.

Heretofore, in this field, there has been an increased demand for portable computer systems, such as laptop, notebook, and recently, sub-notebook computers. The portable computers have dramatically increased the mobility of computing power for the computer user. Since the first portable computer, manufacturers have increased computer mobility by decreasing the size, weight and power demands of portable computers while increasing the battery life for portable computers.

The monitors presently used for portable computers application contribute greatly to the overall size of the portable computer. Whether the monitor is monochrome display, dual-scan color display, or active matrix color display, the monitor must be of a sufficient size to provide the user with readable images. Typically, portable computer monitors have a liquid crystal display system which utilizes a single liquid crystal display. These systems, typically include a top glass and a bottom glass, having thin film transistors therebetween. The system drivers are typically integrated into a circuit board which surrounds the top and bottom glass. These systems also utilize a backlight system that typically includes a diffuser for passing light evenly to the liquid crystal display, a cold cathode fluorescent tube (CCFL) for producing light, a reflector for directing light toward the diffuser, and a light pipe located between the diffuser and the reflector to spread light to the entire surface of the diffuser.

The use of conventional liquid crystal display monitors for portable computer applications, however, creates a limiting factor in the continuing effort to reduce the size of portable computers. Even as technological advances are made to reduce the size of other components of portable computers, the monitors must remain necessarily large in order to provide the user with readable visual image of a sufficient size and to minimize user eyestrain.

SUMMARY OF THE INVENTION

It has been discovered that the use of conventional liquid crystal display monitors in portable computer applications has created a limiting factor with regard to the size and mobility of portable computers. What is needed is a system for generating suitably sized visual images for portable computer applications that is small in size, energy efficient and inexpensive to manufacture.

The present invention disclosed herein comprises a multi-section visual display for producing visual images that appear seamless to the user comprising a foldable frame having an operating position and a storage position, a first visual display secured within the foldable frame, a second visual display secured within the foldable frame and disposed adjacent to the first visual display when the foldable frame is in the operating position, a first light pipe disposed in parallel with the first visual display, and a second light pipe disposed in parallel with the second visual display. The first light pipe and the second light pipe are aligned such that the first light pipe bends light toward the second light pipe and the second light pipe bends light toward the first light pipe when the foldable frame is in the operating position.

In one embodiment of the present invention, the light pipe includes a plurality of parallel fiber optics segments that has a polished surface from which visual images are viewed. In another embodiment of the present invention, the light pipes include an integrated polymeric structure that guides light.

The foldable frame of the multi-section visual display system of the present invention is foldable about a rotatable member which places the first light pipe, the first visual display, the second light pipe, and the second visual display in parallel with one another and places the foldable frame in the storage position.

These and other features of the present invention will be apparent to those skilled in the art from the following detailed description of the invention taken together with the accompanying drawings.

DESCRIPTION OF THE DRAWINGS

In the drawings:

FIG. 1 is a perspective representation of a notebook computer incorporating one embodiment of the multi-section visual display system of the present invention;

FIG. 3 is a schematic diagram of a multi-section liquid crystal display;

Corresponding numerals and symbols in the different figures refer to corresponding parts unless otherwise indicated.

DETAILED DESCRIPTION OF THE INVENTION

Figure 2:
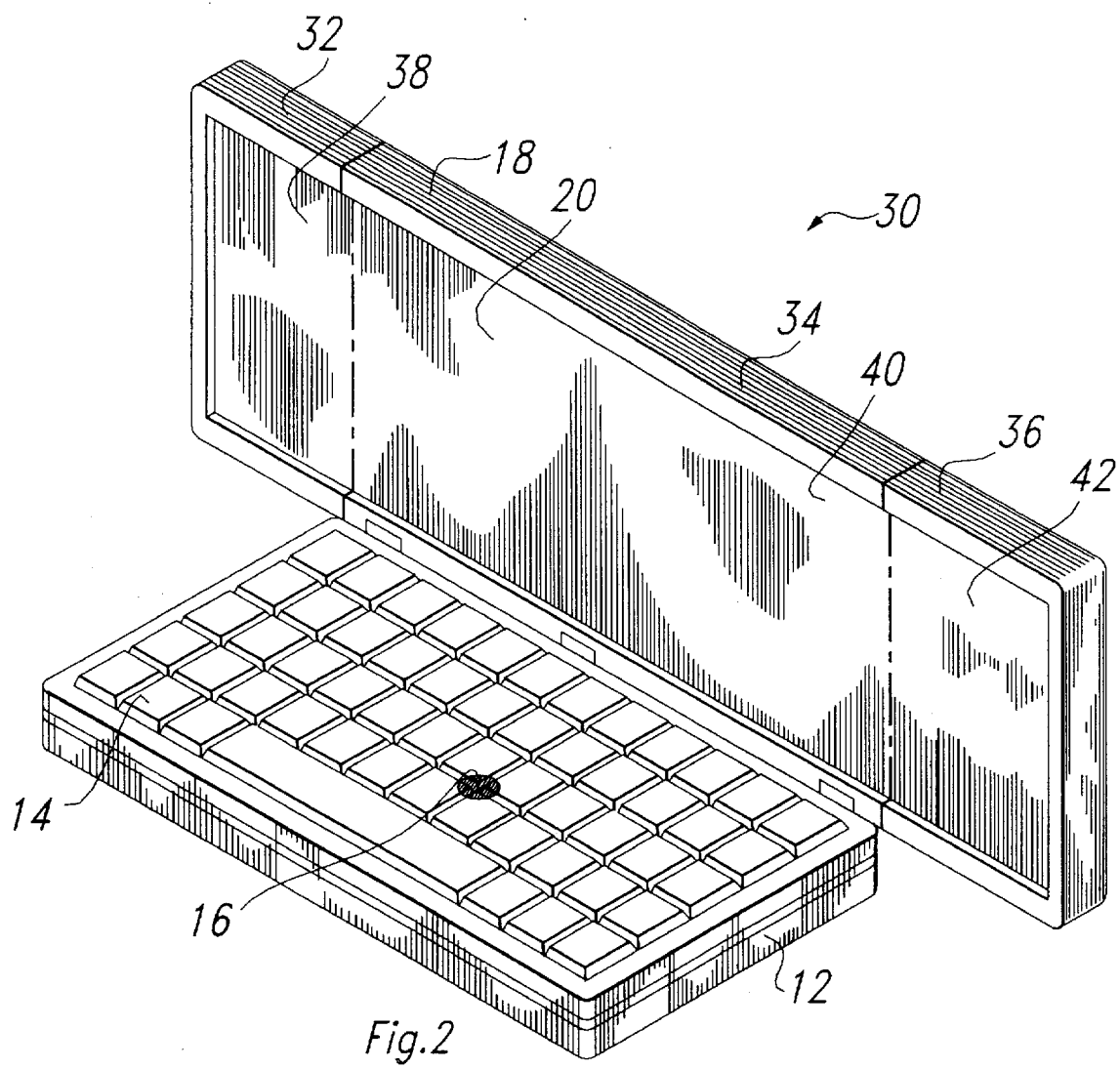
FIG. 2 is a perspective representation of a notebook computer incorporating a second embodiment of the multi-section visual display system of the present invention.

The multi-section visual display system of the present invention may be incorporated into a portable computer that is lightweight, small in size, and energy efficient while providing suitable sized visual images that are easy on the eyes of the user.

In FIG. 1, a multi-section visual display system incorporated into a notebook computer is generally designated 10. Notebook computer 12 has a keyboard 14 and a pointing device 16. Even though FIG. 1 depicts keyboard 14 and pointing device 16 as input devices, it should be understood that a variety of input devices are equally well-suited for the present invention, including, but not limited to, a mouse, a trackball, or a microphone for voice activated software such as Voice Assist by Creative Labs or Listen by Vertex.

Monitor housing 18 of notebook computer 12 contains the multi-section visual display system 20 of the present invention as will be discussed in reference to FIGS. 3, 4, 5 and 6 below. In operating mode, lower section 22 and upper section 24 of monitor housing 18 are aligned adjacent to one another and locked into position thereby aligning lower visual display 26 with upper visual display 28 such that a seamless visual image is generated by notebook computer 12.

In one embodiment, monitor housing 18 is foldable about a hinge (not pictured) placing lower section 22 and upper section 24 of monitor housing 18 in parallel with one another and provides a locking mechanism to secure lower section 22 and upper section 24 of monitor housing 18 together. Monitor housing 18 is further foldable towards keyboard 14 placing notebook computer 12 in a storage position and creating a small in size and highly mobile system.

In another embodiment, upper section 24 of monitor housing 18 is slidably connected with lower section 22 of monitor housing 18 such that upper section 24 may slide rearwardly and downwardly into a locking position placing upper section 24 in parallel with lower section 22 of monitor housing 18. Monitor housing 18 is foldable towards keyboard 14 placing notebook computer 12 in a storage position and creating a small in size and highly mobile system.

Referring to FIG. 2, a multi-section visual display system incorporated into a notebook computer is generally designated 30. Notebook computer 12 has a keyboard 14 and a pointing device 16. Even though FIG. 2 depicts keyboard 14 and pointing device 16 as input devices, it should be understood that a variety of input devices are equally well suited for the present invention, including, but not limited to, a mouse, a trackball, or a microphone for voice activated software.

Monitor housing 18 of notebook computer 12 contains the multi-section visual display system 20 of the present invention. Monitor housing 18 comprises a left section 32, a center section 34, and a right section 36. Within left section 32 of monitor housing 18 is left visual display 38. Within center section 34 of monitor housing 18 is center visual display 40. Within right section 36 of monitor housing 18 is right visual display 42.

In operating mode, left section 32 aligns with center section 34 such that left visual display 38 and center visual display 40 produce a visual image that appears seamless to the user. Also in operating mode, right section 36 and center section 34 of monitor housing 18 align such that right visual display 42 and center visual display 40 produce a visual image that appears seamless to the user.

In storage mode, left section 32 and right section 36 of monitor housing 18 may fold toward center section 34 of monitor housing 18 about hinges (not pictured). In another embodiment, right section 36 and left section 32 of monitor housing 18 are slidably attached to center section 34 such that right section 36 and left section 32 slide rearwardly and toward one another to a locking position behind center section 34 of monitor housing 18. Monitor housing 18 is foldable towards keyboard 15 and may be locked in place to creating a small in size and highly mobile notebook computer 12.

In FIG. 3, a multi-section visual display system 20 is depicted. Multi-section visual display system 20 comprises a foldable frame 44 which has a first section 46 and a second section 48. First liquid crystal display 50 is secured within first section 46 of folding frame 44. Second liquid crystal display 52 is secured within second section 48 of foldable frame 44. Second liquid crystal display 52 is adjacent to first liquid crystal display 50 when folding frame 44 is in an operational position. Liquid crystal displays 50, 52 are of a type that are commonly known in the visual display art and may include a top glass and a bottom glass, having thin film transistors and liquid crystal display material therebetween, and a backlight system which comprises a diffuser for evenly spreading light, a reflector, a lightpipe in between the diffusor and the deflector, and a CCFL tube for providing white light illumination. In addition, visual display system 20 may utilized a plurality of drivers which are in communication with liquid crystal displays 50, 52.

First light pipe 54 is disposed in parallel with first liquid crystal display 50. Second light pipe 56 is disposed in parallel with second liquid crystal display 52. When foldable frame 44 is in the operation position, first light pipe 54 is aligned with second light pipe 56 such that a single seamless visual image is produced. It should be understood that a variety of display systems are equally well-suited for use with light pipes 54, 56 of the present invention, including, but not limited to, cathode ray tube displays, plasma display systems, light emitting diode displays, and electoluminescent displays.

Figure 4:
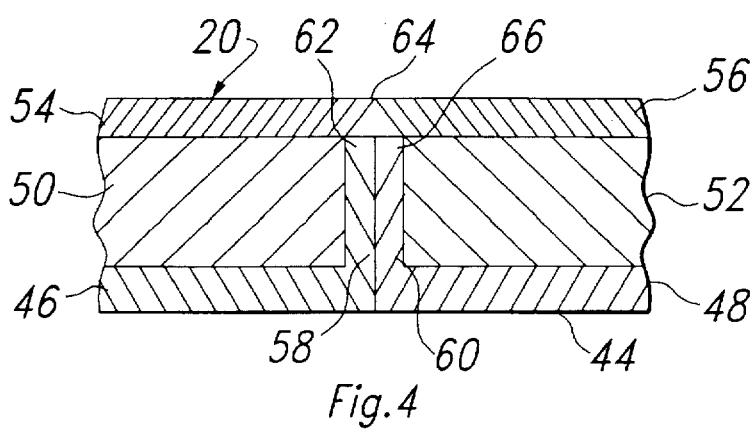
FIG. 4 is a cross-sectional view of the multi-section liquid crystal display taken along line 4—4 of FIG. 3.

FIG. 4 depicts a cross-sectional view of multi-section visual display system 20 taken along line 4—4 of FIG. 3. First liquid crystal display 50 is housed within first section 46 of foldable frame 44. Second liquid crystal display 52 is housed within second section 48 of foldable frame 44. First liquid crystal display 50 and second liquid crystal display 52 are separated by leg 58 of first section 46 and leg 60 of second section 48.

First light pipe 54 is disposed above first liquid crystal display 50. Second light pipe 56 is disposed above second liquid crystal display 52. First light pipe 54 bends light toward second light pipe 56 and second light pipe 56 bends light toward first light pipe 54 when foldable frame 44 is in its operating position such that visual images appear seamless to the eyes of the user.

In one embodiment of the present invention, light pipes 54, 56 may comprise a plurality of parallel fiber optic segments that are cut to length, shaped to provide the required light bending function and polished to provide a smooth surface. In another embodiment of the present invention, light pipes 54, 56 may comprise an integrated polymeric structure that is shaped to guide light. It should be understood, however, that light pipes 54, 56 may comprise a variety of light bending systems which are equally well suited for the present invention in addition to the plurality of parallel fiber optic segments and the integrated polymeric structure.

Still referring to FIG. 4, light from point 62 of first liquid crystal display 50 is bent in first light pipe 54 to point 64 and light from point 66 of second liquid crystal display 52 is bent in by second light pipe 56 to point 64. As light from the entire surface of first liquid crystal display 50 is similarly bent by first light pipe 54 and as light from the entire surface of second liquid crystal display 52 is similarly bent by second light pipe 56, a single visual image is generated by multi-section visual display system 20 which appears seamless along line 68 of FIG. 3.

Figure 5:
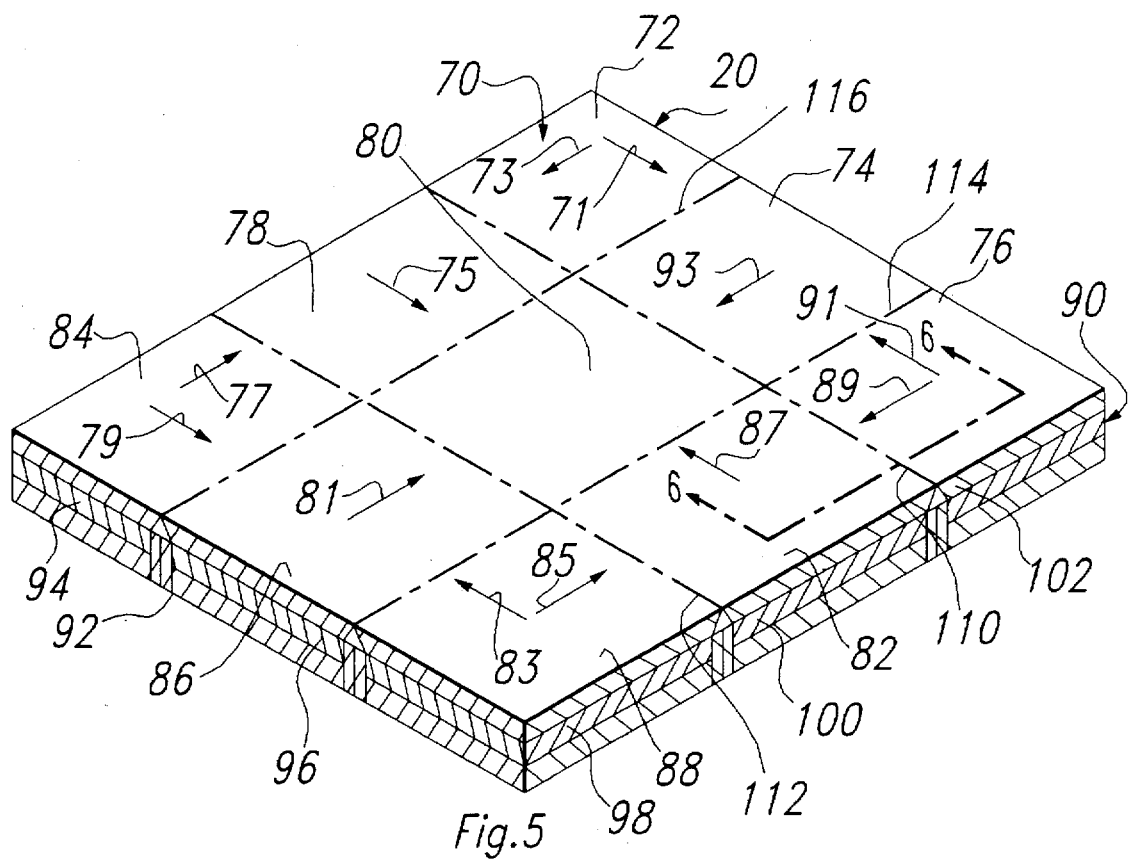
FIG. 5 is a schematic diagram of a multi-section liquid crystal display.

Referring to FIG. 5, another embodiment of a multi-section visual display system 20 of the present invention is depicted. Multi-section visual display system 20 comprises an array of light pipes 70 which consists of light pipes 72, 74, 76, 78, 80, 82, 84, 86, and 88. Each of the light pipes in the array of light pipes 70 is disposed in parallel with, a corresponding liquid crystal display in an array of liquid crystal displays 90. Each liquid crystal display is secured within assembly 92. Each liquid crystal display is of a type that is generally known in the visual display art and may be of the type described in reference to FIG. 3. It should be understood that each of the light pipes in the array of light pipes 70 may comprise a variety of light bending systems which are equally well suited for the present invention including, but not limited to, a plurality of parallel fiber optic segments and an integrated polymeric structure. It should also be understood that a variety of display systems are equally well-suited for use with the array of light pipes 70 of the present invention, including, but not limited to, cathode ray tube displays, plasma display systems, light emitting diode displays, and electo-luminescent displays.

Light pipe 72 bends light from the corresponding liquid crystal display toward light pipe 74 and light pipe 78 as depicted by arrows 71, 73. Light pipe 78 bends light from its corresponding liquid crystal display toward light pipe 80 as depicted by arrow 75. Light pipe 84 bends light from liquid crystal display 94 toward light pipe 78 and light pipe 86 as depicted by arrows 77, 79. Light pipe 86 bends light from liquid crystal display 96 toward light pipe 80 as depicted by arrow 81. Light pipe 88 bends light from liquid crystal display 98 toward light pipe 86 and light pipe 82 as depicted by arrows 83, 85. Light pipe 82 bends light from liquid crystal display 100 toward light pipe 80 as depicted by arrow 87. Light pipe 76 bends light from liquid crystal display 102 toward light pipe 82 and light pipe 74 as depicted by arrows 89, 91. Light pipe 74 bends light from the corresponding liquid crystal display toward light pipe 80 as depicted by arrow 93. Collectively, the array of light pipes 70 creates a single, high resolution visual image which appears seamless to the eyes of the viewer.

Figure 6:
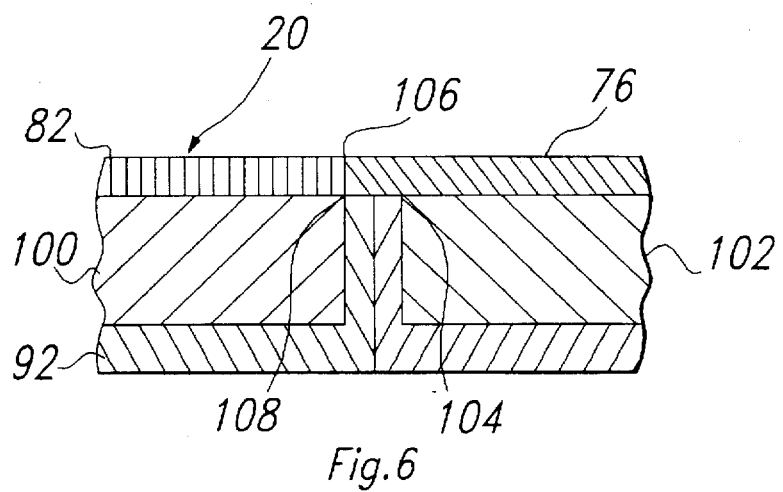
FIG. 6 is a cross-sectional view of the multi-section liquid crystal display taken along line 6—6 of FIG. 5.

FIG. 6 is a cross-sectional view of the multi-section visual display system 20 taken along line 6—6 of FIG. 5. Assembly 92 holds liquid crystal display 101 and liquid crystal display 102. Light pipe 82 is disposed in parallel with liquid crystal display 100. Light pipe 76 is disposed in parallel with liquid crystal display 102. Light pipe 76 bends light from point 104 of liquid crystal display 102 to point 106. Light pipe 82 bends light from point 108 of liquid crystal display 100 to point 106. As light from the entire surface of liquid crystal display 100 is similarly bent by light pipe 82 and as light from the entire surface of liquid crystal display 102 is similarly bent by light pipe 76, a visual image which appears seamless is generated along the corresponding portion of line 110 of FIG. 5. As each of the light pipes in the array of light pipes 70 similarly bend light from the corresponding liquid crystal displays in the array of liquid crystal displays 90, a single visual image is generated by multi-section visual display system 20 which appears seamless along lines 110, 112, 114 and 116 of FIG. 5.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A multi-section visual display system for producing a seamless visual image comprising:
   at least two visual displays disposed in a foldable frame having an operating position and a storage position;
   a light pipe disposed parallel to each of said visual displays; and
   an assembly for mounting said visual displays adjacent to one another such that adjacent light pipes align with one another thereby providing said seamless visual image when in the operating position.

2. The multi-section visual display system as recited in claim 1 wherein each of said light pipes further includes a plurality of parallel fiber optic segments.

3. The multi-section visual display system as recited in claim 2 wherein said plurality of parallel fiber optic segments have a polished surface.

4. The multi-section visual display system as recited in claim 1 wherein each of said light pipes further includes an integrated polymeric structure that guides lights.

5. The multi-section visual display system as recited in claim 1 wherein at least one of said light pipes bends light toward an adjacent light pipe.

6. The multi-section visual display system as recited in claim 1 wherein adjacent light pipes bend light toward one another.

7. The multi-section visual display system as recited in claim 1 wherein said at least two visual displays further includes nine visual displays.

8. The multi-section visual display system as recited in claim 1 wherein said assembly further includes at least one rotatable member and wherein said assembly is foldable about said rotatable member.

9. A multi-section visual display for producing a seamless visual image for a portable computer comprising:
   a foldable frame having an operating position and a storage position;
   a first visual display secured within said foldable frame;
   a second visual display secured within said foldable frame and disposed adjacent to said first visual display when said foldable frame is in said operating position;
   a first light pipe disposed parallel to said first visual display; and
   a second light pipe disposed parallel to said second visual display, said second light pipe aligning with said first light pipe when said foldable frame is in said operating position, thereby providing said seamless visual image.

10. The multi-section visual display as recited in claim 9 wherein light pipes further include a plurality of parallel fiber optic segments.

11. The multi-section visual display as recited in claim 10 wherein said plurality of parallel fiber optic segments have a polished surface.

12. The multi-section visual display as recited in claim 9 wherein light pipes further includes an integrated polymeric structure that guides lights.

13. The multi-section visual display as recited in claim 9 wherein said first light pipe bends light toward said second light pipe when said foldable frame is in said operating position.

14. The multi-section visual display as recited in claim 13 wherein said second light pipe bends light toward said first light pipe when said foldable frame is in said operating position.

15. The multi-section visual display as recited in claim 9 wherein said foldable frame further includes a rotatable member and wherein said foldable frame is foldable about said rotatable member, thereby placing said first light pipe, said first visual display, said second light pipe and said second visual display parallel to one another and placing said foldable frame in said storage position.

16. The multi-section visual display as recited in claim 9 further including a third visual display secured within said foldable frame and disposed adjacent to said second visual display on the side opposite said first visual display when said foldable frame is in said operating position and a third light pipe disposed parallel to said third visual display aligning with said second light pipe when said foldable frame is in said operating position.

17. A method for producing a seamless visual image from a foldable multi-section visual display comprising:

provideing an assembly having a foldable frame with an operating position and a storage position;

mounting said visual displays in said foldable frame in said assembly;

attaching a light pipe to each of said visual displays; and bending light in said light pipes to produce said seamless visual image on said displays when said foldable frame is in said operating position whereby said displays are adjacent to one another.

18. The method for producing a seamless visual image as recited in claim 17 wherein said step of bending light further includes:

aligning a plurality of fiber optic segments;

bending said fiber optic segments into a specified shape;

cutting said plurality of fiber optic segments to create a coplanar surface; and polishing said surface.

19. The method for producing a seamless visual image as recited in claim 17 wherein said step of bending light further includes the step of forming an integrated polymeric structure that guides light.

* * * * *